No. 716,218. Patented Dec. 16, 1902.
A. A. & E. L. GOLDEN.
NUT LOCK.
(Application filed May 2, 1902.)
(No Model.)

Witnesses
C. H. Walker
Geo. E. Tew

Inventors
Arville A. Golden
Emma L. Golden
By
Milo B. Stevens & Co
Attorneys

UNITED STATES PATENT OFFICE.

ARVILLE A. GOLDEN AND EMMA L. GOLDEN, OF EAST LIVERPOOL, OHIO.

NUT-LOCK.

SPECIFICATION forming part of Letters Patent No. 716,218, dated December 16, 1902.

Application filed May 2, 1902. Serial No. 105,623. (No model.)

*To all whom it may concern:*

Be it known that we, ARVILLE A. GOLDEN and EMMA L. GOLDEN, citizens of the United States, residing at East Liverpool, in the county of Columbiana and State of Ohio, have invented certain new and useful Improvements in Nut-Locks; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to nut-locks, and particularly to that class thereof in which the locking engagement is effected by a key or pin.

The object of the invention is to form an improved nut-lock of the class described, and an embodiment of the invention is hereinafter described, and is illustrated in the accompanying drawings, in which—

Figure 1:
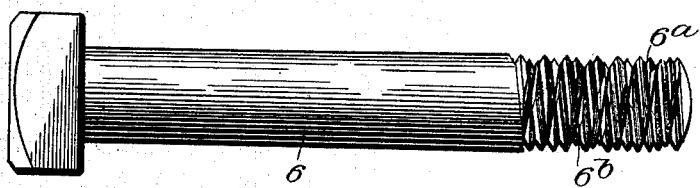
Figure 2:
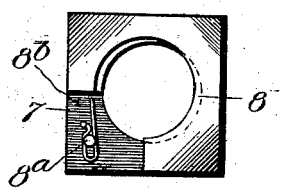
Figure 3:
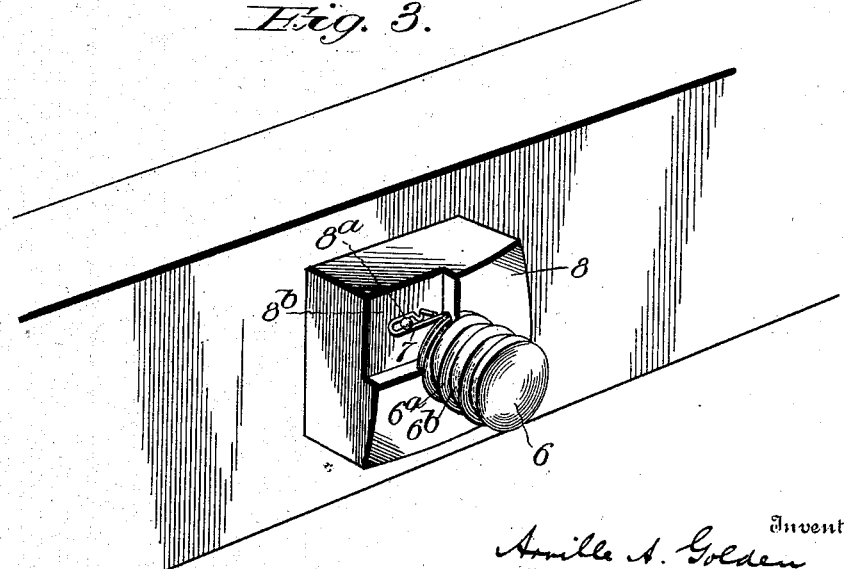

Figure 1 is a plan of the bolt. Fig. 2 is a top view of the nut. Fig. 3 is a perspective view showing the nut and bolt together with the locking-key in position.

Referring specifically to the drawings, the bolt is indicated at 6 and is double-threaded with opposite threads, (indicated at $6^a$ and $6^b$.) The thread carrying the bolt, which in this instance is the right-hand thread $6^a$, is first formed and is then cut across or mutilated by a deeper left-hand thread $6^b$. At the crossing of the threads the body of the main or right-hand thread is cut away by the left-hand groove, forming openings or recesses to receive the tangential key 7, carried by the nut 8. When the key is inserted in the space formed at the crossing of the respective threads, attempted loosening of the nut causes the key to bind between the threads of the nut and the bolt. It is evident that the nut cannot turn if the key enters between the threads of the nut and those of the bolt, and the reverse or left-hand thread simply forms by cutting away portions of the right-hand thread recesses into which the key can be entered.

The key is preferably formed of wire looped over a headed pin $8^a$ and is seated in a recess $8^b$, formed in the top of the nut. This recess is deep enough to extend below the first thread of the nut, so that the key can be entered thereunder.

It is evident that the key need not be attached to the nut, as with a bolt and nut so formed any small piece or nail entered into the recess formed at the crossing of the threads will bind against the threads and lock the nut.

The loop in the key is long enough to permit the necessary tangential movement thereof to insert or remove it.

The left-hand thread may be of any pitch desired, the only difference being that the coarser the thread the fewer crossings will be formed, and consequently the fewer places at which the key can be inserted.

What we claim is—

1. A nut-lock comprising a bolt having opposite crossed threads, a nut, and a key inserted between the nut and the bolt at the crossing of the threads.

2. A nut-lock comprising a bolt having opposite threads one of which is cut deeper than the other, a nut, and a key carried by the nut inserted in the recess formed at a crossing of the threads.

3. A nut-lock comprising a bolt having opposite crossed threads, a nut having a recess leading to one of its threads, and a key carried in the recess and adapted to enter between the nut and bolt into the recess formed at the crossing of the threads of the bolt.

In testimony whereof we affix our signatures in presence of two witnesses.

ARVILLE A. GOLDEN.
EMMA L. GOLDEN.

Witnesses:
FRED GRIM,
JAS. N. RASE.